and 6 are details in perspective respectively

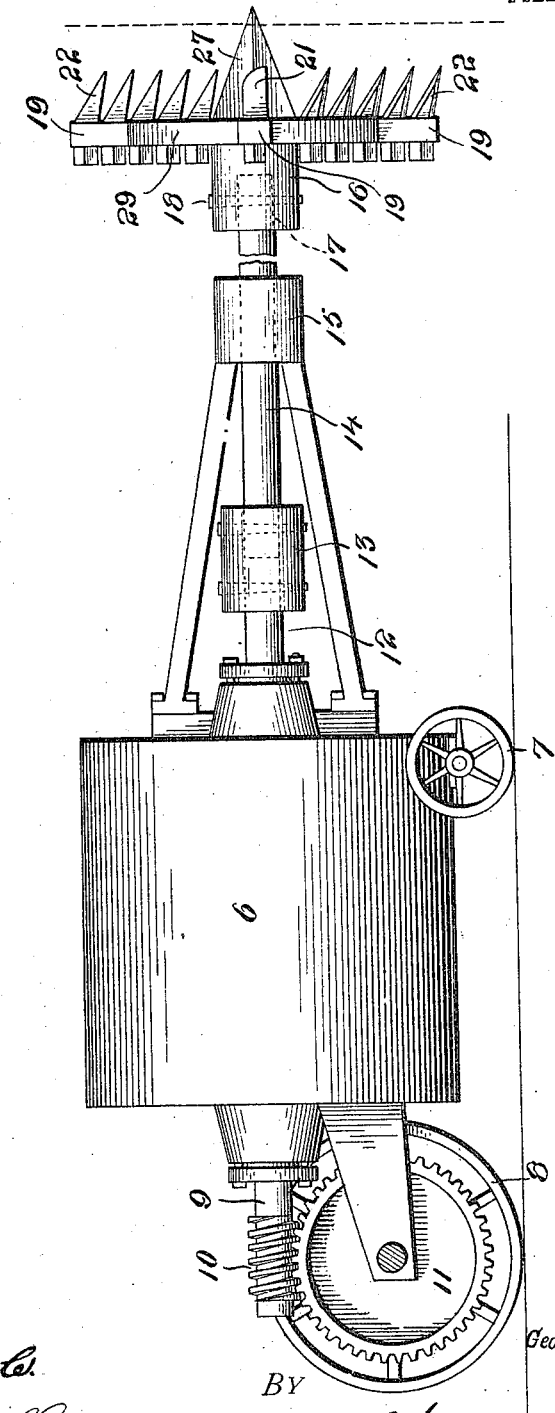

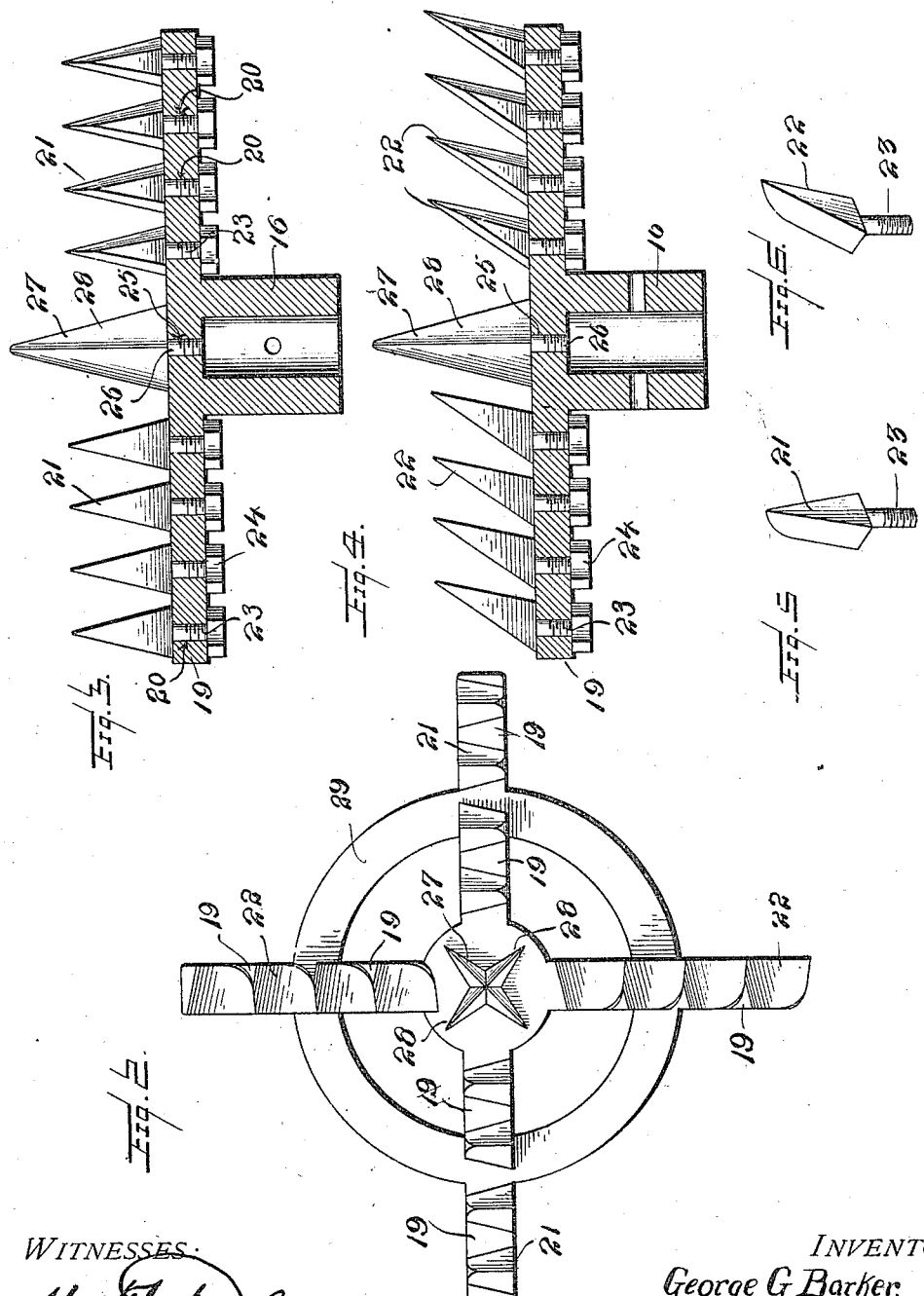

UNITED STATES PATENT OFFICE.

GEORGE G. BARKER, OF UPLAND, PENNSYLVANIA, ASSIGNOR OF ONE-HALF TO WILLIAM C. ALEXANDER, OF MEDIA, PENNSYLVANIA.

ROTARY MINING-DRILL.

966,377. Specification of Letters Patent. Patented Aug. 2, 1910.

Application filed July 2, 1909. Serial No. 505,737.

*To all whom it may concern:*

Be it known that I, GEORGE G. BARKER, a citizen of the United States, residing at Upland, in the county of Delaware and State of Pennsylvania, have invented certain new and useful Improvement in Rotary Mining-Drills, of which the following is a specification.

The present invention relates more particularly to mechanism for mining coal, and especially to the cutting means.

The primary object is to provide a cutter that will operate with great speed and effectiveness, said cutter being simple, so that it can be readily and cheaply manufactured, and being made up of cutting elements that can be removed and replaced with ease and expedition so that they may be maintained in properly sharpened condition, and in case of injury or breakage, may be supplanted by new elements.

The preferred embodiment of the invention is illustrated in the accompanying drawings, wherein:—

Figure 1 is a side elevation of a drilling machine having the novel cutter thereon. Fig. 2 is a plan view of the cutting head. Figs. 3 and 4 are cross sectional views at right angles to said cutting head. Figs. 5 and 6 are details in perspective respectively of the straight and diagonal teeth.

Similar reference numerals designate corresponding parts in all the figures of the drawings.

In the embodiment disclosed, the mining machine briefly described, consists of a body 6 mounted on front supporting wheels 7 and a rear driving wheel 8. This body contains a motor of suitable character, which includes a shaft 9 projecting from its opposite ends. The rear end of the shaft carries a worm 10 meshing with a worm wheel 11 that is fast to the rear driving wheel axle, so that the forward movement or feed of the machine is effected upon the rotation of the motor. Secured to the other end of the shaft 9 is a stub 12 carrying a coupling 13, in which is detachably fitted a cutter stem or shaft 14 journaled in a suitable projecting bracket 15. This stem or shaft 14 has fitted upon its free end a head 16, said head being provided with a socket 17 to receive the end of the shaft and being pinned thereto, as shown at 18 or otherwise suitably fastened. The head 16 carries radial arms 19 provided with sockets 20, and secured to said arms are rows of teeth 21 and 22. These teeth have stems 23 that pass through the sockets 20 with nuts 24 threaded upon their rear ends. The teeth taper outwardly to points, and also taper rearwardly to provide clearance. The teeth 21 have their opposite side faces correspondingly beveled, so that the longitudinal axes of these teeth are disposed parallel to the axis of rotation of the head. These teeth are slightly spaced apart, as shown. The other teeth 22 are disposed at an inclination, and operate diagonally in the spaces between the paths of movement of the teeth 21. It will be observed particularly by reference to Fig. 4 that the inclined teeth are carried by the two opposite arms, and that they all are inclined in the same direction so that their paths of movement are set at opposite inclinations. In other words, the teeth of one arm incline toward the axis of rotation of the tool head, while those of the other arm incline away from such axis. The head 16 is provided in its front end with a threaded socket 25, into which is screwed the stem 26 of a centering cutter 27 that tapers to a point and projects beyond the free ends of the cutting teeth. This centering cutter has its different faces inset to provide a plurality of radial beveled cutting edges 28.

It will be clear that this structure is exceedingly simple, and the parts are such that a thorough and rapid cutting action is secured, the inclined teeth cutting away the portions left by the straight teeth. Moreover with this device, whenever any tooth becomes dull or injured, it may be removed and resharpened or replaced by a new one without dismembering the entire structure.

From the foregoing, it is thought that the construction, operation and many advantages of the herein described invention will be apparent to those skilled in the art without further description, and it will be understood that various changes in the size, shape, proportion and minor details of construction may be resorted to without departing from the spirit or sacrificing any of the advantages of the invention.

Having thus fully described my invention, what I claim as new, and desire to secure by Letters Patent, is:—

1. In a mining drill, the combination with a rotary support, of radial rows of teeth carried thereby, the teeth of one row having their longitudinal axes disposed substantially parallel to the axis of rotation of the support, the teeth of another row being set at an inclination to said axis.

2. In a mining drill, the combination with a rotary support comprising a head having radial arms, said arms having sockets therethrough, of rows of spaced teeth carried by the arms, said teeth having stems extending through and fastened in the sockets, the teeth of certain of the rows having equally convergent opposite faces and longitudinal axes that are disposed longitudinally of the axis of rotation of the head, the teeth of other rows being set at an inclination and operating in the spaces between the paths of movement of the first mentioned rows.

In testimony whereof I hereunto affix my signature in the presence of two witnesses.

GEORGE G. BARKER.

Witnesses:
S. W. FIELDS,
ALBERT E. HOLL.